United States Patent
Kim et al.

(10) Patent No.: US 12,368,153 B2
(45) Date of Patent: Jul. 22, 2025

(54) NEGATIVE ACTIVE MATERIAL AND RECHARGEABLE LITHIUM BATTERY INCLUDING SAME

(71) Applicant: SAMSUNG SDI CO., LTD., Yongin-si (KR)

(72) Inventors: Yookyung Kim, Yongin-si (KR); Youngugk Kim, Yongin-si (KR); Jungho Lee, Yongin-si (KR); Jaehou Nah, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 18/386,068

(22) Filed: Nov. 1, 2023

(65) Prior Publication Data

US 2024/0347689 A1  Oct. 17, 2024

(30) Foreign Application Priority Data

Apr. 17, 2023  (KR) .................. 10-2023-0050155

(51) Int. Cl.
*H01M 4/13* (2010.01)

(52) U.S. Cl.
CPC ..................................... *H01M 4/13* (2013.01)

(58) Field of Classification Search
CPC ..................................................... H01M 4/13
See application file for complete search history.

(56) References Cited

U.S. PATENT DOCUMENTS

| | | | |
|---|---|---|---|
| 2013/0252110 A1 | 9/2013 | Park et al. | |
| 2019/0237796 A1 | 8/2019 | Honda | |
| 2019/0341617 A1* | 11/2019 | Boies | H01M 4/625 |
| 2019/0355971 A1* | 11/2019 | Kim | H01M 4/133 |
| 2020/0411844 A1 | 12/2020 | Oh et al. | |
| 2021/0249648 A1* | 8/2021 | Choi | H01M 4/364 |
| 2021/0399304 A1* | 12/2021 | Lee | H01M 4/587 |
| 2022/0320509 A1 | 10/2022 | Chu et al. | |
| 2022/0411277 A1 | 12/2022 | Kang et al. | |
| 2023/0378431 A1 | 11/2023 | Kwon | |
| 2024/0213530 A1* | 6/2024 | Sakaida | H01B 13/00 |

FOREIGN PATENT DOCUMENTS

| | | | | |
|---|---|---|---|---|
| JP | 2016170930 A | * | 9/2016 | ............ Y02E 60/10 |
| JP | 2017-199662 | | 11/2017 | |
| KR | 10-2013-0106687 A | | 9/2013 | |
| KR | 10-1494715 B1 | | 2/2015 | |
| KR | 2016109946 A | * | 9/2016 | .......... H01M 4/0404 |
| KR | 10-1880603 B1 | | 7/2018 | |
| KR | 10-2019-0107503 A | | 9/2019 | |
| KR | 10-2020-0145296 A | | 12/2020 | |
| KR | 10-2021-0000983 A | | 1/2021 | |
| KR | 10-2246197 B1 | | 4/2021 | |
| KR | 10-2021-0057271 A | | 5/2021 | |
| KR | 2021156918 A | * | 12/2021 | ........ H01M 10/0525 |
| KR | 10-2022-0067638 A | | 5/2022 | |
| KR | 10-2023-0002065 A | | 1/2023 | |

OTHER PUBLICATIONS

U.S. Appl. No. 18/638,791, filed Apr. 18, 2024.
Qian Sun, et al., "Achieving a bifunctional conformal coating on nickel-rich cathode LiNi0.8Co0.1Mn0.1O2 with half-cyclized polyacrylonitrile", Electrochimica Acta, vol. 386, 138440 (2021).
International Search Report dated May 13, 2024.

* cited by examiner

*Primary Examiner* — Muhammad S Siddiquee
(74) *Attorney, Agent, or Firm* — Lee IP Law, P.C.

(57) ABSTRACT

A negative active material, including a first active material including a silicon core and a carbon coating layer on the core, a carbon second active material having an aspect ratio of about 4 to about 100, and a crystalline carbon third active material.

20 Claims, 1 Drawing Sheet

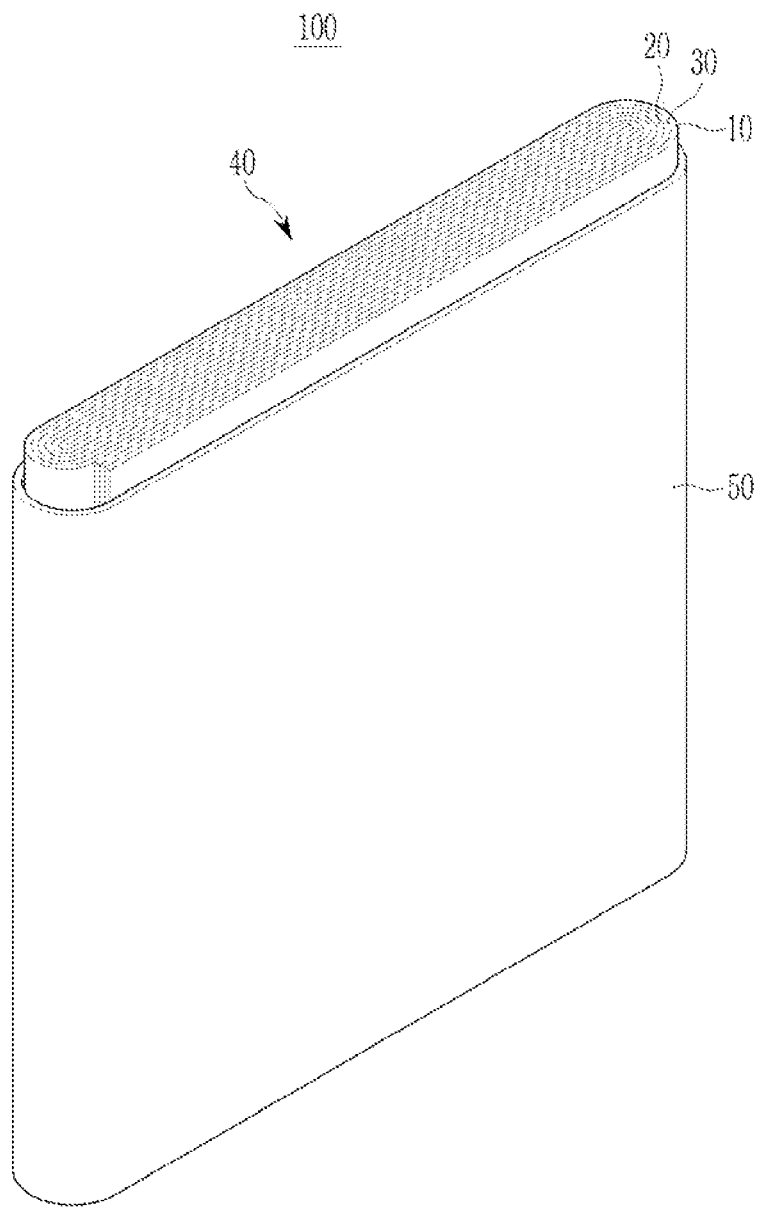

NEGATIVE ACTIVE MATERIAL AND RECHARGEABLE LITHIUM BATTERY INCLUDING SAME

CROSS-REFERENCE TO RELATED APPLICATION

This application claims priority to and the benefit of Korean Patent Application No. 10-2023-0050155, filed in the Korean Intellectual Property Office on Apr. 17, 2023, the entire contents of which are incorporated herein by reference.

BACKGROUND

1. Field

Embodiments relate to a negative active material and a rechargeable lithium battery including the same.

2. Description of the Related Art

Recently, the rapid development of electronic devices such as mobile phones, laptop computers, and electric vehicles using batteries resulted in a surprising increase in demand for rechargeable batteries with relatively high capacity and lighter weight. For example, the rechargeable lithium battery has recently drawn attention as a driving power source for portable devices, because it has light weight and high energy density. Accordingly, research and development for improving performances of rechargeable lithium is actively pursued.

SUMMARY

Embodiments are directed to a negative active material, including a first active material including a silicon core and a carbon coating layer on the core, a carbon second active material having an aspect ratio of about 4 to about 100, and a crystalline carbon third active material.

In embodiments the carbon second active material may have an average length of a long axis of about 20 μm or more.

In embodiments the carbon second active material may have an average length of a long axis of about 20 μm to about 100 μm.

In embodiments the carbon second active material may include crystalline carbon.

In embodiments the carbon second active material may include artificial graphite.

In embodiments the carbon second active material may have an aspect ratio of about 4 to about 50.

In embodiments the carbon second active material may have an aspect ratio of about 4 to about 20.

In embodiments the carbon second active material may have an aspect ratio of about 5 to about 20.

In embodiments the carbon coating layer of the first active material may include semi-crystalline carbon or amorphous carbon.

In embodiments the carbon coating layer of the first active material may have a thickness of about 1 nm to about 2,000 nm.

In embodiments the carbon coating layer of the first active material may have a thickness of about 1 nm to about 1,000 nm.

In embodiments the carbon coating layer of the first active material may include semi-crystalline carbon, amorphous carbon, or a combination thereof.

In embodiments the silicon core of the first active material may include silicon, $SiO_x$, $0<x<2$, or a combination thereof.

In embodiments the first active material may have a particle diameter of about 1 μm to about 9 μm.

In embodiments the first active material may have protrusions and depressions on a surface.

In embodiments the first active material may have an urchin-type shape.

In embodiments the amorphous carbon may include soft carbon, hard carbon, mesophase pitch carbide, sintered cokes, or a combination thereof.

In embodiments the negative active material may include about 4 wt % to about 20 wt % of the first active material, about 20 wt % to about 48 wt % of the carbon second active material, and about 48 wt % to about 76 wt % of the crystalline carbon third active material based on a total weight of the negative active material.

In embodiments the crystalline carbon third active material may include natural graphite, artificial graphite, or a combination thereof.

Embodiments are directed to a negative electrode including the negative electrode, a positive electrode, and an electrolyte.

BRIEF DESCRIPTION OF THE DRAWING

Features will become apparent to those of skill in the art by describing in detail exemplary embodiments with reference to the attached drawing in which:

the FIGURE is a schematic perspective view of a rechargeable lithium battery according to one or embodiments.

DETAILED DESCRIPTION

Example embodiments will now be described more fully hereinafter with reference to the accompanying drawing; however, they may be embodied in different forms and should not be construed as limited to the embodiments set forth herein. Rather, these embodiments are provided so that this disclosure will be thorough and complete, and will fully convey exemplary implementations to those skilled in the art. As used herein, the term "or" is not an exclusive term, e.g., "A or B" would include A, B, or A and B."

In the present disclosure, when a definition is not otherwise provided, a particle diameter indicates an average particle diameter or size (D50) where a cumulative volume is about 50 volume % in a particle size distribution. The average particle size (D50) may be measured by a suitable method, for example, by a particle size analyzer, or by a transmission electron microscopic image, or a scanning electron microscopic image. Alternatively, a dynamic light-scattering measurement device may be used to perform a data analysis, and the number of particles may be counted for each particle size range, and from this, the average particle diameter (D50) value may be easily obtained through a calculation.

A negative active material according to one or more embodiments may include a first active material including a core including a silicon material and a carbon coating layer on the core; a carbon second active material having an aspect ratio of about 4 to about 100; and crystalline carbon third active material.

As such, the negative active material according to one embodiment may include three active materials, the first active material, the second active material, and the third active material.

The first active material may include a core including a silicon material and a carbon coating layer positioned on the core and may be a two-component material. The carbon coating layer may include semi-crystalline carbon or amorphous carbon.

The silicon material, e.g., silicon particles may include silicon (Si), silicon oxide ($SiO_x$, $0<x<2$), or a combination thereof. In an implementation, the first active material may consist of the silicon material core and a semi-crystalline carbon or an amorphous carbon coating layer coated on the core. The size of the silicon material may be about 10 nm to about 1 μm, and, e.g., a size of the silicon material may be about 10 nm to about 200 nm.

If the negative active material were to include the first active material, the cycle-life characteristics may be improved.

In one or more embodiments, the carbon coating layer may be formed by physical coating. The physical coating may be, e.g., a chemical vapor deposition (CVD). The deposition may be carried out at a temperature of about 1,000° C. or more, e.g., at about 1,000° C. to about 1,100° C. The deposition may be performed by using a carbon gas. In an implementation, the deposition may be performed by injecting the carbon gas into the silicon material. The carbon gas may be a methane ($CH_4$) gas, an ethylene ($C_2H_4$) gas, an acetylene ($C_2H_2$) gas, a propane ($C_3H_8$) gas, a propylene ($C_3H_6$) gas, or a combination thereof.

In an implementation, the carbon gas may be decomposed to generate a semi-crystalline carbon or an amorphous carbon, which may form a coating layer surrounding the surface of the silicon material and a carbon layer protruding from the surface of the silicon material, e.g., a carbon layer having protrusions and depressions on the surface may be formed.

The first active material may have the protrusions and depressions formed on the surface thereof. According to one or more embodiments, the first active material may have an urchin-type shape.

A thickness of the carbon coating layer may be about 1 nm to about 2,000 nm, or about 1 nm to about 1,000 nm. If the thickness of the carbon coating layer is within these ranges, the charge and discharge efficiency and the rate capability may be improved.

An average particle diameter of the first active material may be about 1 μm to about 9 μm.

In one or more embodiments, if the first active material has an urchin-type shape, a length from a surface to an end of a protrusion and depression that is protruded outwardly may be more than about 0 nm and about 100 nm or less, or more than about 10 nm and about 50 nm or less.

In the first active material, a mixing ratio of the carbon coating layer and the silicon material may be a weight ratio of about 3:7 to about 5:5, or more desirably a weight ratio of about 4:6. The ratio of the carbon coating layer and the silicon material within these ranges may allow for maintaining a stable cycle-life, while having the advantageous of high-capacity and high efficiency.

In one or more embodiments, the amorphous carbon may be soft carbon, hard carbon, mesophase pitch carbide, sintered cokes, or a combination thereof. The semi-crystalline carbon may be a carbonaceous material with higher crystallinity than such an amorphous carbon and with lower crystallinity than crystalline carbon such as graphite.

The second active material may be a crystalline carbon having an aspect ratio (a ratio of length of long axis/length of short axis) of about 4 to about 100. In one embodiment, the second active material may have an aspect ratio of about 4 to about 50, about 4 to about 20, or about 5 to about 20.

Such a second active material may be a rod-type crystalline carbon which may further improve ionic conductivity. The first active material may have the advantage of excellent cycle-life characteristics, but may have a somewhat low ionic conductivity, which may be compensated by using the rod-type crystalline carbon second active material to improve ionic conductivity.

The second active material may serve as a supporter and may act as a passage for transferring lithium ions from a current collector to the first active material or the third active material. The second active material may improve the contact between the active materials, and thus, resistance may be reduced and contact between the active material and the current collector may readily occur.

The second active material may serve as a support to form a space in the active material layer, which may absorb the volume expansion of the first active material, and may thus, help prevent volume expansion.

The effect of the rod-type crystalline carbon having the above aspect ratio as the second active material may be not realized from carbon nanotube which has similar linear-type thereto. Unlike the rod-type crystalline carbon, a carbon nanotube does not give capacity and thus, the energy density may be deteriorated. A carbon nanotube is a linear-type material, the contact with the active material may not be maintained due to repeated contraction and expansion of the active material during charging and discharging, and thus, identical effects to the rod-type crystalline carbon may not be exhibited.

The second active material may have an average length of about 20 μm or more, about 20 μm to about 100 μm, or about 30 μm to about 70 μm. The average length of the second active material refers to a long diameter, i.e., a size of the long axis among the long axis and the short axis of the rod-type (stick-type) crystalline carbon. The second active material with these ranges of average length may sufficiently serve as the supporter.

The second active material may be artificial graphite. If the second active material is artificial graphite, charge and discharge efficiency and cycle-life characteristic may be much improved, compared to natural graphite.

The crystalline carbon third active material may be natural graphite, artificial graphite, or a combination thereof. The third active material may have a spherical shape. In one or more embodiments, the spherical shape may not be a perfect spherical shape, but may be a slightly distorted spherical shape, or may be any shape such as an oval or a polygon shape. The crystalline carbon third active material may be in the form of secondary particles in which small diameter primary particles are agglomerated, or may be in the form of single particles.

In an implementation, the negative active material may include the crystalline carbon third active material, and the initial cycle-life may be improved. Capacity and charge and discharge efficiency may also be improved.

As such, the negative active material according to one or more embodiments may include the aforementioned first active material, second active material and third active material and may exhibit long cycle-life due to use of the first active material, excellent ionic and electrical conductivities due to use of the second active material, and improvements in initial cycle-life due to use of the third active material.

In the negative active material according to one or more embodiments, an amount of the first active material may be about 4 wt % to about 20 wt %, or about 5 wt % to about 18 wt % based on a total weight of the negative active material. If the amount of the first active material is within these ranges, capacity may be further improved.

An amount of the second active material may be about 20 wt % to about 48 wt %, or about 25 wt % to about 40 wt % based on a total weight of the negative active material. If the amount of the second active material is within these ranges, the ion conductivity and electrical conductivity may be improved, and resultantly, the rate capability and cycle-life of the battery may be further improved.

An amount of the third active material may be about 48 wt % to about 76 wt %, or about 50 wt % to about 70 wt % based on a total weight of the negative active material. If the amount of the third active material is within these ranges, the more enhanced charge and discharge efficiency may be achieved.

The negative active material according to one or more embodiments may be applicable for a rechargeable lithium battery.

A rechargeable lithium battery according to another embodiment may include a negative electrode including the negative active material, a positive electrode, and an electrolyte.

The negative electrode may include a current collector and a negative active material layer on at least one surface of the current collector.

According to one or more embodiments, the negative active material layer may include the negative active material and a binder, and may further include a conductive material.

In the negative active material layer, the amount of the negative active material may be about 95 wt % to about 98 wt % based on the total 100 wt % of the negative active material layer.

The negative active material layer may include a binder and may further include a conductive material. An amount of the binder may be about 1 wt % to about 5 wt % based on the total 100 wt % of the negative active material layer. An amount of the conductive material may be about 1 wt % to about 5 wt % based on the total 100 wt % of the negative active material layer.

The binder may improve the binding properties of negative active material particles with one another and with a current collector. The binder may be a non-aqueous binder, an aqueous binder, or a combination thereof.

The non-aqueous binder may be an ethylene propylene copolymer, polyacrylonitrile, polystyrene, polyvinylchloride, carboxylated polyvinylchloride, polyvinyl fluoride, polyurethane, polytetrafluoroethylene, polyvinylidene fluoride, polyethylene, polypropylene, polyamide imide, polyimide, or combinations thereof.

The aqueous binder may be a styrene-butadiene rubber, an acrylated styrene-butadiene rubber (ABR), an acrylonitrile-butadiene rubber, an acrylic rubber, a butyl rubber, a fluorine rubber, an ethylene oxide-containing polymer, polyvinyl pyrrolidone, polypropylene, polyepichlorohydrin, polyphosphazene, an ethylene propylene diene copolymer, polyvinyl pyridine, chlorosulfonated polyethylene, latex, a polyester resin, an acrylic resin, a phenolic resin, an epoxy resin, polyvinyl alcohol, or a combination thereof.

If the aqueous binder is used as a negative electrode binder, a cellulose compound may be further used to provide viscosity. The cellulose compound may include, e.g., carboxymethyl cellulose, hydroxypropylmethyl cellulose, methyl cellulose, or alkali metal salts thereof. The alkali metal may be Na, K, or Li. The thickener may be included in an amount of about 0.1 parts by weight to about 3 parts by weight based on 100 parts by weight of the negative active material.

The conductive material may be included to provide electrode conductivity, and any electrically conductive material may be used as a conductive material unless it causes a chemical change. In an implementation, the conductive material may be, e.g., a carbon material such as natural graphite, artificial graphite, carbon black, acetylene black, ketjen black, a carbon fiber, and the like; a metal material of a metal powder or a metal fiber including copper, nickel, aluminum, silver, and the like; a conductive polymer such as a polyphenylene derivative; or a mixture thereof.

The current collector may include, e.g., a copper foil, a nickel foil, a stainless steel foil, a titanium foil, a nickel foam, a copper foam, a polymer substrate coated with a conductive metal, and a combination thereof.

The positive electrode may include a current collector and a positive active material layer formed on the current collector.

The positive active material may include lithiated intercalation compounds that reversibly intercalate and deintercalate lithium ions. In some embodiments, one or more composite oxides of a metal, e.g., cobalt, manganese, nickel, and a combination thereof, and lithium, may be used. In an implementation, the compounds represented by one of the following chemical formulae may be used. $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 < \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.5$, $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.5$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.5$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.5$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.5$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cL^1_dG_eO_2$ ($0.90 \leq a \leq 1.8$, $0 \leq b \leq 0.9$, $0 \leq c \leq 0.5$, $0 \leq d \leq 0.5$, $0 \leq e \leq 0.1$); $Li_aNi_bCo_cL^1_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $Li_aFePO_4$ ($0.90 \leq a \leq 1.8$)

In the above chemical formulae, A may be, e.g., Ni, Co, Mn, or a combination thereof; X may be, e.g., Al, Ni, Co, Mn, Cr, Fe, Mg, Sr, V, a rare earth element, or a combination thereof; D may be, e.g., O, F, S, P, or a combination thereof; E may be, e.g., Co, Mn, or a combination thereof; T may be, e.g., F, S, P, or a combination thereof; G may be, e.g., Al, Cr, Mn, Fe, Mg, La, Ce, Sr, V, or a combination thereof; Q may be, e.g., Ti, Mo, Mn, or a combination thereof; Z may be, e.g., Cr, V, Fe, Sc, Y, or a combination thereof; J may be, e.g., V, Cr, Mn, Co, Ni, Cu, or a combination thereof; $L^1$ may be, e.g., Mn, Al, or a combination thereof.

The compounds may have a coating layer on the surface, or may be mixed with another compound having a coating layer. The coating layer may include at least one coating element compound, e.g., an oxide of a coating element, a hydroxide of a coating element, an oxyhydroxide of a coating element, an oxycarbonate of a coating element, or a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or mixture thereof. The coating layer may be disposed in a method having no adverse influence on properties of a positive active material by using these elements in the compound, and, in an implementation, the method may include any coating method such as spray coating, dipping, and the like, but is not illustrated in more detail since it is well-known in the related field.

In the positive electrode, an amount of the positive active material may be about 90 wt % to about 98 wt % based on the total weight of the positive active material layer.

In one or embodiments, the positive active material layer may further include a binder and a conductive material. The binder and the conductive material may be included in an amount of about 1 wt % to about 5 wt %, respectively based on the total amount of the positive active material layer.

The binder may improve binding properties of positive active material particles with one another and with a current collector. In an implementation, the binder may be, e.g., polyvinyl alcohol, carboxymethyl cellulose, hydroxypropyl cellulose, diacetyl cellulose, polyvinylchloride, carboxylated polyvinylchloride, polyvinyl fluoride, an ethylene oxide-containing polymer, polyvinyl pyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like.

The conductive material may be included to provide electrode conductivity, and any electrically conductive material may be used as a conductive material unless it causes a chemical change. In an implementation, the conductive material may include, e.g., a carbon material such as natural graphite, artificial graphite, carbon black, acetylene black, ketjen black, a carbon fiber and the like; a metal material of a metal powder or a metal fiber including copper, nickel, aluminum, silver, and the like; a conductive polymer such as a polyphenylene derivative; or a mixture thereof.

The current collector may include Al.

The electrolyte may include a non-aqueous organic solvent and a lithium salt.

The non-aqueous organic solvent may serve as a medium for transmitting ions taking part in the electrochemical reaction of a battery.

The non-aqueous organic solvent may include a carbonate, ester, ether, ketone, alcohol, or aprotic solvent.

The carbonate solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester solvent may include methyl acetate, ethyl acetate, n-propyl acetate, dimethyl acetate, methyl propionate, ethyl propionate, propyl propionate, decanolide, mevalonolactone, caprolactone, or the like. The ether solvent may include dibutyl ether, tetraglyme, diglyme, dimethoxyethane, 2-methyltetrahydrofuran, tetrahydrofuran, or the like. The ketone solvent may include cyclohexanone, or the like. The alcohol solvent may include ethyl alcohol, isopropyl alcohol, and the like, and in an implementation the aprotic solvent may include, e.g., nitriles such as R—CN (where R may be a C2 to C20 linear, branched, or cyclic hydrocarbon, and may include a double bond, an aromatic ring, or an ether bond), amides such as dimethylformamide, dioxolanes such as 1,3-dioxolane, sulfolanes, and the like.

The organic solvent may be used alone or in a mixture. If the organic solvent is used in a mixture, the mixture ratio may be controlled in accordance with a desirable battery performance, and it may be well known to those skilled in the related art.

The carbonate solvent may include a mixture with a cyclic carbonate and a linear carbonate. The cyclic carbonate and linear carbonate may be mixed together in a volume ratio of about 1:1 to about 1:9, and if the mixture is used as an electrolyte, it may have enhanced performance.

The organic solvent may further include an aromatic hydrocarbon solvent as well as the carbonate solvent. The carbonate solvent and aromatic hydrocarbon solvent may be mixed together in a volume ratio of about 1:1 to about 30:1.

The aromatic hydrocarbon organic solvent may be an aromatic hydrocarbon compound represented by Chemical Formula 1.

[Chemical Formula 1]

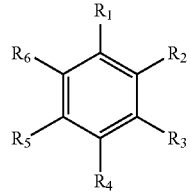

In Chemical Formula 1, $R_1$ to $R_6$ may be the same or different and may be, e.g., hydrogen, a halogen, a C1 to C10 alkyl group, a haloalkyl group, and a combination thereof.

In an implementation, the aromatic hydrocarbon organic solvent may be, e.g., benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, or a combination thereof.

The electrolyte may further include vinylethyl carbonate, vinylene carbonate, an ethylene carbonate compound represented by Chemical Formula 2 as an additive for improving cycle life.

[Chemical Formula 2]

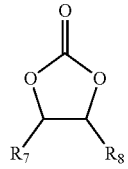

In Chemical Formula 2, $R_7$ and $R_8$ may be the same or different and may each be independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously hydrogen.

In an implementation, the ethylene carbonate compound may be, e.g., difluoro ethylene carbonate, chloroethylene carbonate, dichloroethylene carbonate, bromoethylene carbonate, dibromoethylene carbonate, nitroethylene carbonate, cyanoethylene carbonate, fluoroethylene carbonate, or the like. An amount of the additive for improving the cycle-life characteristics may be used within an appropriate range.

The lithium salt dissolved in an organic solvent may supply a battery with lithium ions, basically operate the rechargeable lithium battery, and improve transportation of the lithium ions between a positive electrode and a negative electrode. In an implementation, the lithium salt may include at least one or two supporting salts, e.g., $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide: LiFSI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$, wherein x and y are natural numbers, e.g., an integer of about 1 to about 20, lithium difluoro (bisoxolato) phosphate, LiCl, LiI, $LiB(C_2O_4)_2$ (lithium bis(oxalato) borate: LiBOB) and lithium difluoro (oxalato) borate (LiDFOB). A concentration of the lithium salt may range from about 0.1 M to about 2.0 M. If the lithium salt is included at the above concentration range, an electrolyte may have excellent performance and lithium ion mobility due to optimal electrolyte conductivity and viscosity.

A separator may be between the positive electrode and the negative electrode depending on a type of a rechargeable lithium battery. The separator may use polyethylene, polypropylene, polyvinylidene fluoride or multi-layers thereof having two or more layers and may be a mixed multilayer such as a polyethylene/polypropylene double-layered separator, a polyethylene/polypropylene/polyethylene triple-layered separator, a polypropylene/polyethylene/polypropylene triple-layered separator, or the like.

The FIGURE is a schematic perspective view of a rechargeable lithium battery according to an embodiment. The rechargeable lithium battery according to some embodiments is illustrated as a prismatic battery and may include variously-shaped batteries such as a cylindrical battery, a pouch battery, or the like.

Referring to the FIGURE, a rechargeable lithium battery 100 according to an embodiment may include an electrode assembly 40 manufactured by winding a separator 30 disposed between a positive electrode 10 and a negative electrode 20 and a case 50 housing the electrode assembly 40. An electrolyte may be impregnated in the positive electrode 10, the negative electrode 20 and the separator 30.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

An ethylene ($C_2H_4$) gas was injected into Si, to perform a chemical vapor deposition (CVD) at 1,000° C., thereby preparing a first active material (average particle diameter 6 μm) including a Si core and a soft carbon coating layer formed on the core. A weight ratio of the Si core and the coating layer was a weight ratio of 6.5:3.5. The first active material had an urchin-type in which the protrusion and the depressions were formed on the surface, a length from the surface of the active material to end of the outwardly protrusion and depression was 50 nm, and the thickness of the coating layer was 1000 nm.

A rod-type artificial graphite having an average length of a long axis of 60 μm and an aspect ratio of 10 was used as a second active material.

A mixture of artificial graphite and natural graphite (mixing ratio: 8:2 by weight ratio) was used as a third active material.

11.7 wt % of the first active material, 34.3 wt % of the second active material, 51.5 wt % of the third active material, 1.5 wt % of styrene-butadiene rubber binder, and 1.0 wt % of carboxymethyl cellulose thickener were mixed in a water solvent to prepare a negative active material slurry.

The negative active material slurry was coated on a Cu foil current collector, dried and pressurized under a general procedure to prepare a negative electrode including the current collector and a negative active material layer formed on the current collector.

Using the negative electrode, a lithium metal counter electrode, and an electrolyte, a coin-type half-cell was fabricated. The electrolyte used was a 1.5 M $LiPF_6$ solution in a mixed solvent of ethylene carbonate, ethylmethyl carbonate and dimethyl carbonate (20:10:70 volume ratio).

Example 2

A negative electrode and a half-cell were fabricated by the same procedure as in Example 1, except that a natural graphite was only used as the third active material, instead of using the mixture of artificial graphite and natural graphite (mixing ratio: 8:2 by weight ratio).

Example 3

A negative electrode and a coin-type half-cell were fabricated by the same procedure as in Example 1, except that a rod-type artificial graphite having an average length of a long axis of 70 μm and an aspect ratio of 15 was used as a second active material.

Comparative Example 1

A negative electrode and a coin-type half-cell were fabricated by the same procedure as in Example 1, except that carbon nanotube having an average length of 5 nm and an aspect ratio of 1000 was used as a second active material.

Comparative Example 2

A negative electrode and a half-cell were fabricated by the same procedure as in Example 1, except that a rod-type artificial graphite having an average length of a long axis of 20 μm and an aspect ratio of 3 was used as a second active material.

Comparative Example 3

The first active material prepared in Example 1 was used. A second active material in which artificial graphite was mixed with natural graphite was prepared.

11.7 wt % of the first active material, 85.8 wt % of the second active material, 1.5 wt % of styrene-butadiene rubber binder, and 1.0 wt % of carboxymethyl cellulose were mixed in water to prepare a negative active material slurry.

The negative active material slurry was coated on a Cu foil current collector, dried and pressurized under a general procedure to prepare a negative electrode including the current collector and a negative active material layer formed on the current collector.

Using the negative electrode, a lithium metal counter electrode, and an electrolyte, a coin-type half-cell was fabricated. The electrolyte used was a 1.5 M $LiPF_6$ solution in a mixed solvent of ethylene carbonate, ethylmethyl carbonate and dimethyl carbonate (20:10:70 volume ratio).

Comparative Example 4

The first active material prepared in Example 1 was used.
A rod-type artificial graphite having an average length of 60 μm and an aspect ratio of 10 was used as a second active material.

11.7 wt % of the first active material, 85.8 wt % of the second active material, 1.5 wt % of styrene-butadiene rubber binder, and 1.0 wt % of a carboxymethyl cellulose thickener were mixed in water to prepare a negative active material slurry.

The negative active material slurry was coated on a Cu foil current collector, dried and pressurized under a general procedure to prepare a negative electrode including the current collector and a negative active material layer formed on the current collector.

Using the negative electrode, a lithium metal counter electrode, and an electrolyte, a coin-type half-cell was fabricated. The electrolyte used was a 1.5 M $LiPF_6$ solution in a mixed solvent of ethylene carbonate, ethylmethyl carbonate and dimethyl carbonate (20:10:70 volume ratio).

Experimental Example 1) Initial Efficiency

The half-cells according to Examples 1 to 3 and Comparative Examples 1 to 6 were formation charged and discharged at 0.1C once and then the formation charged and discharged cells were charged and discharged at 0.2C once. The formation charge capacity is shown in Table 1. A ratio of discharge capacity relative to charge capacity, i.e., initial efficiency during charging and discharging at 0.1C once were determined. The results are shown in Table 1.

Experimental Example 2) High Rate Characteristics

The half-cells according to Examples 1 to 3 and Comparative Examples 1 to 6 were charged and discharged at 0.2C once and charged and discharged at 2C once. A ratio of discharge capacity at 2C relative to discharge capacity at 0.2C was measured and a ratio of charge capacity at 2C relative to charge capacity at 0.2C was measured. The results are shown in Table 1, as dischargeability and chargeability, respectively.

TABLE 1

|  | Capacity (mAh/g) | Initial efficiency (%) | Dischargeability (2.0 C/ 0.2 C, %) | Chargeability (2.0 C/ 0.2 C, %) |
|---|---|---|---|---|
| Example 1 | 500 | 92 | 97 | 31 |
| Example 2 | 498 | 90 | 97 | 30 |
| Example 3 | 500 | 91 | 97 | 31 |
| Comparative Example 1 | 475 | 88 | 95 | 24 |
| Comparative Example 2 | 500 | 90 | 96 | 27 |
| Comparative Example 3 | 505 | 90 | 96 | 25 |
| Comparative Example 4 | 490 | 88 | 97 | 30 |

As shown in Table 1, the cells according to Examples 1 to 3 satisfied all conditions required for using practical cell which were capacity of 495 mAh/g, initial efficiency of 90%, high rate dischargeability of 95% and high rate chargeability of 30%.

Whereas, Comparative Example 1 exhibited satisfactory capacity and high rate dischargeability, but unsatisfactory initial efficiency and high rate chargeability. Comparative Examples 2 and 3 exhibited unsatisfactory chargeability, and Comparative Example 4 exhibited unsatisfactory capacity and initial efficiency.

By way of summation and review, a rechargeable lithium battery may include a positive electrode and a negative electrode which may include an active material being capable of intercalating and deintercalating lithium ions, and an electrolyte, and generate electrical energy due to the oxidation and reduction reaction if lithium ions are intercalated and deintercalated into the positive electrode and the negative electrode.

As a positive active material for a rechargeable lithium battery, transition metal compounds such as a lithium cobalt oxide, a lithium nickel oxide, a lithium manganese oxide, or the like have been used.

As a negative active material, crystalline carbonaceous materials such as natural graphite or artificial graphite, or amorphous carbonaceous material, or silicon active material such as Si have been used.

Recently, as battery performances such as a high energy density and excellent efficiency is required, the demands for using silicon active materials realizing high capacity has been increasing, and the demands for a negative electrode exhibiting good charge and discharge efficiency and rapid charging performances has been increasing.

One or more embodiments provides a negative active material exhibiting excellent cycle-life characteristic, high energy density and high charge and discharge efficiency. Another embodiment provides a rechargeable lithium battery including the negative active material. A negative active material according to one or more embodiments may exhibit excellent high rate characteristic and electrical conductivity.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A negative active material, comprising:
a first active material comprising a silicon core and a carbon coating layer on the core;
a carbon second active material consisting of crystalline carbon and having an aspect ratio of about 4 to about 100; and
a crystalline carbon third active material.

2. The negative active material as claimed in claim 1, wherein the carbon second active material has an average length of a long axis of about 20 μm or more.

3. The negative active material as claimed in claim 1, wherein the carbon second active material comprises artificial graphite.

4. The negative active material as claimed in claim 1, wherein the carbon coating layer of the first active material comprises semi-crystalline carbon or amorphous carbon.

5. The negative active material as claimed in claim 1, wherein the carbon coating layer of the first active material comprises semi-crystalline carbon, amorphous carbon, or a combination thereof.

6. The negative active material as claimed in claim 1, wherein the silicon core of the first active material comprises silicon, $SiO_x$, in which $0<x<2$, or a combination thereof.

7. The negative active material as claimed in claim 1, wherein the first active material has protrusions and depressions on a surface.

8. The negative active material as claimed in claim 1, wherein the first active material has an urchin-type shape.

9. The negative active material as claimed in claim 8, wherein the amorphous carbon comprises soft carbon, hard carbon, mesophase pitch carbide, sintered cokes, or a combination thereof.

10. The negative active material as claimed in claim 1, wherein the negative active material comprises about 4 wt % to about 20 wt % of the first active material, about 20 wt % to about 48 wt % of the carbon second active material, and about 48 wt % to about 76 wt % of the crystalline carbon third active material based on a total weight of the negative active material.

11. The negative active material as claimed in claim 1, wherein the crystalline carbon third active material comprises natural graphite, artificial graphite, or a combination thereof.

12. A rechargeable lithium battery, comprising:
a negative electrode comprising the negative electrode of claim 1;
a positive electrode; and
an electrolyte.

13. The negative active material as claimed in claim 1, wherein the carbon second active material has an average length of a long axis of about 20 μm to about 100 μm.

14. The negative active material as claimed in claim 1, wherein the carbon second active material has an aspect ratio of about 4 to about 50.

15. The negative active material as claimed in claim 1, wherein the carbon coating layer of the first active material has a thickness of about 1 nm to about 2,000 nm.

16. The negative active material as claimed in claim 1, wherein the first active material has a particle diameter of about 1 μm to about 9 μm.

17. The negative active material as claimed in claim 1, wherein a mixing ratio of the carbon coating layer and the silicon material is a weight ratio of about 3:7 to about 5:5 in the first active material.

18. The negative active material as claimed in claim 1, wherein the first active material has an urchin-type shape, a length from a surface to an end of a protrusion and depression that is protruded outwardly is than about 0 nm and about 100 nm or less.

19. The negative active material as claimed in claim 1, wherein the carbon second active material is a rod-type crystalline carbon.

20. The negative active material as claimed in claim 1, wherein the crystalline carbon third active material has a spherical shape.

* * * * *